United States Patent
Fu et al.

(10) Patent No.: US 9,194,733 B2
(45) Date of Patent: Nov. 24, 2015

(54) PHOTOELECTRIC-TYPE CONTINUOUS LIQUID LEVEL MEASUREMENT METHOD AND DEVICE

(71) Applicant: Polymer(SuZhou) Sensing Technology Co., Ltd, Suzhou, Jiangsu (CN)

(72) Inventors: Jun Fu, Beijing (CN); Lianbo Yu, Beijing (CN); Wei Chang, Beijing (CN)

(73) Assignee: POLYMER(SUZHOU) SENSING TECHNOLOGY CO. LTD., Suzhou, Jiangsu (CN)

( * ) Notice: Subject to any disclaimer, the term of this patent is extended or adjusted under 35 U.S.C. 154(b) by 0 days.

(21) Appl. No.: 14/397,130

(22) PCT Filed: Sep. 29, 2012

(86) PCT No.: PCT/CN2012/082414
§ 371 (c)(1),
(2) Date: Oct. 24, 2014

(87) PCT Pub. No.: WO2013/159489
PCT Pub. Date: Oct. 31, 2013

(65) Prior Publication Data
US 2015/0115158 A1     Apr. 30, 2015

(30) Foreign Application Priority Data
Apr. 26, 2012    (CN) .......................... 2012 1 0127410

(51) Int. Cl.
*G01F 23/292*    (2006.01)
*G01F 23/00*    (2006.01)
*G01J 5/20*    (2006.01)

(52) U.S. Cl.
CPC ............ *G01F 23/0061* (2013.01); *G01F 23/00* (2013.01); *G01F 23/0007* (2013.01); *G01F 23/292* (2013.01); *G01F 23/2927* (2013.01); *G01J 5/20* (2013.01)

(58) Field of Classification Search
CPC .... G01J 5/20; G01F 23/0061; G01F 23/0007; G01F 23/00
See application file for complete search history.

(56) References Cited

U.S. PATENT DOCUMENTS

| 4,051,726 A | * | 10/1977 | Hastbacka | .................. 73/290 R |
| 6,057,772 A | | 5/2000 | Burkett | |
| 6,925,871 B2 | | 8/2005 | Frank | |
| 8,072,594 B1 | * | 12/2011 | McMahon | .................... 356/246 |

FOREIGN PATENT DOCUMENTS

| CN | 2300092 Y | 12/1998 |
| CN | 101387538 A | 3/2009 |
| CN | 101520338 A | 9/2009 |

(Continued)

OTHER PUBLICATIONS

International Application No. PCT/CN2012/082414 Search Report dated Jan. 17, 2013, 6 pages.

*Primary Examiner* — David Porta
*Assistant Examiner* — Hugh H Maupin
(74) *Attorney, Agent, or Firm* — Conley Rose, P.C.

(57) ABSTRACT

A photoelectric-type continuous liquid level measurement method is applied to a photoelectric-type continuous liquid level measurement device which comprises at least one sensor module formed by cascading a plurality of sensors, and comprises: driving the sensors one by one from bottom to top to take a liquid level measurement; after detecting the light intensity of a detection light returned from the position where the sensors are located, the sensors which are currently in a driving state conducting analog-to-digital conversion on a voltage value corresponding to the detected light intensity to obtain current analog-to-digital conversion data; according to the correlation between a preset liquid level and the analog-to-digital conversion data, determining the liquid level of the position where the sensors are located; and summarizing to a transmitter module the liquid level measured by each of the sensors to obtain the total liquid level of a currently measured.

16 Claims, 6 Drawing Sheets

(56) References Cited

FOREIGN PATENT DOCUMENTS

| | | |
|---|---|---|
| CN | 102095470 A | 6/2011 |
| CN | 102095473 A | 6/2011 |
| CN | 102301207 A | 12/2011 |
| CN | 102645253 A | 8/2012 |
| JP | 4-125427 A | 4/1992 |

\* cited by examiner

PHOTOELECTRIC-TYPE CONTINUOUS LIQUID LEVEL MEASUREMENT METHOD AND DEVICE

This application is the national phase of International Application No. PCT/CN2012/082414, titled "PHOTOELECTRIC-TYPE CONTINUOUS LIQUID LEVEL MEASUREMENT METHOD AND DEVICE", filed on Sep. 29, 2012, which claims the priority to Chinese patent application No. 201210127410.3, entitled "METHOD FOR PHOTOELECTRIC-TYPE CONTINUOUS MEASUREMENT OF LIQUID LEVEL AND APPARATUS THEREOF" and filed with the State Intellectual Property Office of People's Republic of China on Apr. 26, 2012, which are hereby incorporated by reference in their entireties.

FIELD

The disclosure relates to the field of calibration for containers, and particularly to a method for a photoelectric-type continuous measurement of a liquid level and an apparatus thereof.

BACKGROUND

Level is classified into liquid level and material level. The liquid level may be measured with a liquid level annunciator or through a continuous liquid level measurement. The liquid level annunciator is for measuring liquid levels at several fixed positions, and is applied in, for example, warnings for upper and lower limits of the liquid level. The continuous liquid level measurement, i.e., continuously measuring the liquid level is widely used in fields of, for example, oil, chemical industry and food processing.

At present, methods for continuous liquid level measurement include a hand-dipping method, a float ball method, a servo method, a static pressure method, a magnetostriction method, an ultrasonic method, an optical fiber sensor method, a capacitance method and so on. In practical applications, proper kinds of liquid level meters may be selected based on factors such as price, measurement accuracy and characteristics of the measured medium. Although with so many optional measurement methods, it is still difficult to satisfy requirements under some conditions.

For example, when applying the above methods in measuring the liquid level in a fuel tank of a diesel generator acting as a back-up source for telecommunication, the following problems may be caused.

1. Non-electricity measurement methods such as a glass tube method and the hand-dipping method require participation of humans and are not applicable for working conditions without the presence of humans.

2. The diesel fuel may generate cotton-shaped solid precipitates during storage, and the precipitates may accumulate to a thickness from 2 cm to 5 cm. In usage of a meter such as an optical fiber sensor or an immersion liquid level sensor, the sensor should be placed at the bottom of a container, and an elastic diaphragm for pressure transmission is liable to be blocked or damaged because of the solid precipitates, thereby resulting in, for example, poor pressure transmission. Therefore, problems such as liquid level fluctuation and large measurement bias may be caused in practical applications.

3. Fuel tanks of different volumes and shapes may have measurement ranges from 30 cm to 200 cm. The float ball method, dedicated for small measurement ranges, is not applicable for measuring the liquid level of the fuel tank. Meters having fixed measurement ranges, utilized in methods such as the magnetostriction method and the capacitance method, are inconvenient in transportation, installation and operation.

4. The diesel generator may operate with vibration. Methods such as a float bowl method or the servo method, in which sensors including moving mechanical parts are utilized, are not applicable under conditions with vibration.

As another application example, a floater method is widely used in measuring the liquid level of automobile fuel tank. A floater is sleeved on a straight tube, a magnetic ring is arranged in the floater, and multiple reed switches are arranged in the straight tube. The floater slides up and down along the straight tube based on the liquid level. The reed switch close to the floater is turned on in response to the influence of the magnetic ring in the floater, and accordingly, a liquid level signal is output. The floater method has a simple principle and a low cost, however, the liquid level measurement with this method is discontinuous and the moving mechanical part is of poor reliability.

An optical fiber pressure sensor may also be used for measuring the liquid level. The optical fiber pressure sensor has a structure as follows. In a housing, an end of one optical fiber is placed at a front end of an elastic diaphragm, and a reflection film is provided on the elastic diaphragm. When the liquid level changes, the elastic diaphragm moves, and accordingly, the reflection film moves. Change of the pressure (the liquid level) may be sensed based on change of the light intensity sensed by a probe. This kind of sensor is slender and small and may be made into a specific shape to match a measured component. However, the sensor also has disadvantages such as difficult manufacture and high cost. Furthermore, the sensor should be provided with the elastic membrane. Same as a diffusion silicon diaphragm capsule immersion liquid level sensor, the optical fiber pressure sensor is not applicable for performing measurement with the existence of solid precipitates in the fuel tank of the diesel generator.

With the rapid development of science and technology nowadays, a method for accurately measuring the liquid level and an apparatus thereof, which may be used under bad operating conditions and may not be influenced by specific factors, are required to measure the levels of liquids in various devices and apparatuses.

SUMMARY

The disclosure intends to provide a method for a photoelectric-type continuous measurement of a liquid level and an apparatus thereof, to overcome a conventional case that an accurate liquid level measurement is unavailable without sufficient operating conditions.

To solve the above disadvantages, the disclosure provides the following solutions.

A method for a photoelectric-type continuous measurement of a liquid level is provided, the method is applied to an apparatus for the photoelectric-type continuous measurement of the liquid level including at least one sensor module including a plurality of cascaded sensors, and the method includes:

driving the sensors upwardly one by one, to perform measurements of liquid levels, after a light intensity of a probe light returned at a position of a sensor currently in a driving state is detected, performing an analogue-to-digital conversion on a voltage corresponding to the detected light intensity to obtain current analogue-to-digital conversion data, determining the liquid level at the position of a current sensor based on a preset correspondence between the liquid level and the analogue-to-digital conversion data, and after a current sensor module drives the respective sensors in the current sensor module in a time division way, summarizing the liquid levels correspondingly measured by the respective sensors to a transmitter module to analyze and process the summarized liquid levels to obtain a total liquid level of a currently measured liquid, and outputting the total liquid level in a specified interface form.

Preferably, the process of driving the current sensor to detect the light intensity returned at the position of the current sensor and performing the analogue-to-digital conversion on the voltage corresponding to the detected light intensity includes:

propagating a probe light in a total reflection way along an internal surface of the sensor to return a probe light having a strong light intensity, in the case that there is no measured liquid at the position of the sensor; performing the analogue-to-digital conversion on a high voltage corresponding to the strong light intensity of the returned probe light; and outputting data obtained through the analogue-to-digital conversion;

as the level of the measured liquid increases upwardly, propagating a probe light from the sensor to the measured liquid through a refraction at a portion with existence of the liquid and maintaining propagating a probe light in the total reflection way at a portion without existence of the liquid, to return a probe light having a light intensity changing with the liquid level; performing the analogue-to-digital conversion on a voltage corresponding to the returned probe light having the changing light intensity; and outputting data obtained through the analogue-to-digital conversion;

propagating a probe in a refraction way along the internal surface of the sensor to return a probe light having a weak light intensity, in the case that the sensor is completely immersed in the measured liquid; performing the analogue-to-digital conversion on a low voltage corresponding to the weak light intensity of the returned probe light; and outputting data obtained through the analogue-to-digital conversion.

Preferably, the process of driving the sensors upwardly one by one to perform measurements of liquid levels further includes:

before driving the sensor, detecting the light intensity of an external background light source at the position of the sensor, and performing the analogue-to-digital conversion on the detected light intensity of the external background light source to obtain a background voltage corresponding to the light intensity of the external background light source;

after driving the sensor, detecting a current light intensity on the sensor, and performing the analogue-to-digital conversion on a voltage corresponding to the detected current light intensity to obtain a current voltage of the sensor currently in a driving state after the analogue-to-digital conversion;

acquiring a difference between the current voltage and the background voltage as a calibrated voltage corresponding to the sensor currently in the driving state; and determining the liquid level at the position of the current sensor based on the preset correspondence between the liquid level and the analogue-to-digital conversion data.

Preferably, the way to drive the sensors includes a constant current driving.

Preferably, in the case that the apparatus for the photoelectric-type continuous measurement of the liquid level includes two or more cascaded sensor modules, the method further includes:

supplying power to the cascaded sensor modules via the transmitter module, wherein the sensor modules are cascaded via a signal line, and the signal line comprises an RS485, and upwardly cascaded or downwardly cascaded handshake lines;

determining one sensor module as a bottom sensor module in the case that the one sensor module is in a high level state, and sending address information of the bottom sensor module to a sensor module nearest to and located above the bottom sensor module;

adjusting, by each sensor module, a voltage state of the each sensor module into a high voltage state based on the address information received from a sensor module nearest to and located below the each sensor module, and sending, by the each sensor module, the address information of the each sensor module to a sensor module nearest to and located above the each sensor module;

repeating the above step until an interface circuit of a transmitter and all the sensor modules are in the high level state;

sending positioning completion information by the interface circuit of the transmitter module, to complete an automatic positioning of the respective cascaded sensor modules;

during the measurement of the liquid level, driving the individual sensor modules upwardly one by one based on the positioning of the sensor modules, and controlling, in a time division way by the respective sensor modules, the sensors corresponding to the respective sensor modules to perform the measurements of the liquid levels; and after each of the sensor modules measures corresponding liquid levels, summarizing information of the liquid levels measured by each of the sensor modules to a front end of a transmitter interface module to analyze and process the summarized information, to obtain the total liquid level of the currently measured liquid, and outputting the total liquid level in the specified interface form.

Preferably, in case of starting a new measurement of the liquid level, the method further includes:

acquiring a previously recorded total liquid level of the measured liquid;

determining a sensor corresponding to the total liquid level, a position of a sensor module comprising the determined sensor and a previous liquid level corresponding to the determined sensor, based on the total liquid level;

initiating the currently determined sensor and determining a liquid level at the position of the currently determined sensor;

in the case that the determined sensor is partly immersed in the liquid, increasing or decreasing the total liquid level to obtain a current total liquid level after starting the new measurement of the liquid level;

in the case that the current total liquid level is known and it is determined that all sensors below a current surface of the liquid are completely immersed in the liquid and all sensors above the current surface of the liquid are totally not immersed in the liquid, respectively driving the sensors with determined liquid level states, acquiring calibrated voltages, and updating corresponding full scale data or corresponding zero point data, to complete a dynamic self-calibration for a re-measurement;

in the case that the determined sensor is completely immersed in the liquid, initiating a sensor nearest to and located above the determined sensor or a sensor at a bottom of a sensor module nearest to and located above the determined sensor to perform the measurement of the liquid level, and returning to perform the step of determining a liquid level at the position of the currently determined sensor; and in the case that the determined sensor is totally not immersed in the liquid, initiating a sensor nearest to and located below the determined sensor or a sensor at a top of a sensor module nearest to and located below the determined sensor to perform the measurement of the liquid level, and returning to perform the step of determining a liquid level at the position of the currently determined sensor.

An apparatus for a photoelectric-type continuous measurement of a liquid level is provided, which includes at least one sensor module.

The sensor module includes:

a plurality of cascaded sensors, where each of the plurality of cascaded sensors is for detecting a light intensity at a position of the each sensor and a voltage corresponding to the light intensity;

an analogue-to-digital converter for performing an analogue-to-digital conversion on the voltages output by the sensors; and a microprocessor connected with the cascaded sensors, where the microprocessor is for, upwardly driving the cascaded sensors one by one to perform the measurement of the liquid level, receiving voltages after the analogue-to-digital conversion of the respective sensors output by the analogue-to-digital converter, determining liquid levels at positions of the respective sensors based on a preset correspondence between the liquid levels and the voltages after the analogue-to-digital conversion, and summarizing the liquid levels correspondingly measured by the respective sensors to a front end of a transmitter interface to analyze and process the summarized liquid levels, to output a total liquid level of a currently measured liquid.

Preferably, the sensor includes:

an infrared light source for emitting an incident light, the infrared light source including an infrared light emitting diode;

a cavity formed by an optically denser material, where the cavity is for propagating the incident light emitted from the infrared light source, and the optically denser material includes a plastic with a preset quantity of organic pigments, or an organic glass;

a blocking structure arranged at an outside of the cavity, where the blocking structure is for blocking a light emitted by a background light source from entering an inside of the sensor; and a photosensitive device for receiving or sensing a light intensity of an emergent light after being propagated by the cavity and determining a voltage corresponding to the received or sensed light intensity;

the sensor has a measurement range from 10 mm and 20 mm.

Preferably, the sensor module further includes:

a temperature sensor for performing a temperature compensation on the infrared light source and on a photoelectric receiver; and a cascading interface circuit for performing an automatic cascading positioning and transmitting liquid level information.

Preferably, in the case that the apparatus for the photoelectric-type continuous measurement of the liquid level includes two or more cascaded sensor modules, the apparatus further includes a cascading interface module and a transmitter module.

The cascading interface module includes:

a voltage regulator module for providing a stable operating voltage to a transmitter, and a digital cascading interface for linking positioning information reflecting positions of the respective sensor modules and liquid level information recorded by the respective sensor modules, and transmitting the positioning information and the liquid level information to the transmitter;

and the transmitter module is for supplying power to the cascaded sensor modules, coordinating the individual sensor modules to complete the automatic cascading positioning, controlling each of the sensor modules to perform measurements of liquid levels, acquiring and analyzing the liquid levels correspondingly measured by the respective sensor modules, to determine the total liquid level of the currently measured liquid, and outputting the total liquid level in a specified output form.

According to the above technical solutions, the method for the photoelectric-type continuous measurement of the liquid level and the apparatus thereof are provided in the disclosure. Under a time division control and an upward driving by the sensor module, a current sensor detects the light intensity of the probe light returned at the position of the current sensor. The analogue-to-digital conversion is performed on the voltage corresponding to the detected light intensity. The liquid level at the position of the current sensor is determined based on the preset correspondence between the liquid level and the voltage after the analogue-to-digital conversion. After completing the measurements of the liquid levels, the liquid levels at individual sensors are summarized to the front end of the transmitter interface via data transmissions among different modules, the summarized liquid levels are analyzed and processed to obtain the total liquid level of the current liquid, and the total liquid level is output in the specified interface form. With a modular structure adopted in the disclosure, the apparatus for the photoelectric-type continuous measurement of the liquid level may be assembled freely and the transportation is convenient, thereby improving practicability of the apparatus for different measurement ranges on site. Furthermore, influences caused by solid particles present in the liquid and by factors such as environment, air pressure and vibration are avoided, making it possible to measure the liquid level accurately under relatively bad working conditions. In addition, the apparatus may be cleaned through, for example, washing or wiping, and the maintenance is convenient.

DETAILED DESCRIPTION OF THE EMBODIMENTS

A method for a photoelectric-type continuous measurement of a liquid level and an apparatus thereof are provided according to the following embodiments of the disclosure, to continuously and accurately measure the liquid level in various environments based on photoelectric principles.

For clarifying objectives, technical solutions and advantages according to the embodiments of the disclosure, the technical solutions according to the embodiments of the disclosure are described clearly and completely hereinafter in conjunction with drawings used in the embodiments of the disclosure. The described embodiments are only a part of the embodiments of the disclosure, rather than all the embodiments. Any other embodiments made by those skilled in the art based on the embodiments of the disclosure without any creative efforts should fall in the scope of protection of the disclosure.

The essence of the disclosure is described as follows. Sensors are upwardly driven one by one with a photoelectric approach, to perform a measurement of a liquid level. A sensor currently in a driving state detects a light intensity of a returned probe light at a position of the sensor, and then performs an analogue-to-digital conversion on a voltage corresponding to the detected light intensity to acquire current analogue-to-digital conversion data. A liquid level at the position of a current sensor is determined based on a preset correspondence between the liquid level and the analogue-to-digital conversion data. After a current sensor module drives respective sensors in the current sensor module in a time division way, liquid levels correspondingly measured by the respective sensors are summarized to a transmitter module to be analyzed and processed, to obtain a total liquid level of a currently measured liquid, and the total liquid level is output in a specified interface form.

With the above steps of the continuous measurement of the liquid level, the photoelectric principles may be utilized to accurately and continuously measure the liquid level in various environments, which is detailed with the following embodiments.

A First Embodiment

Figure 1:
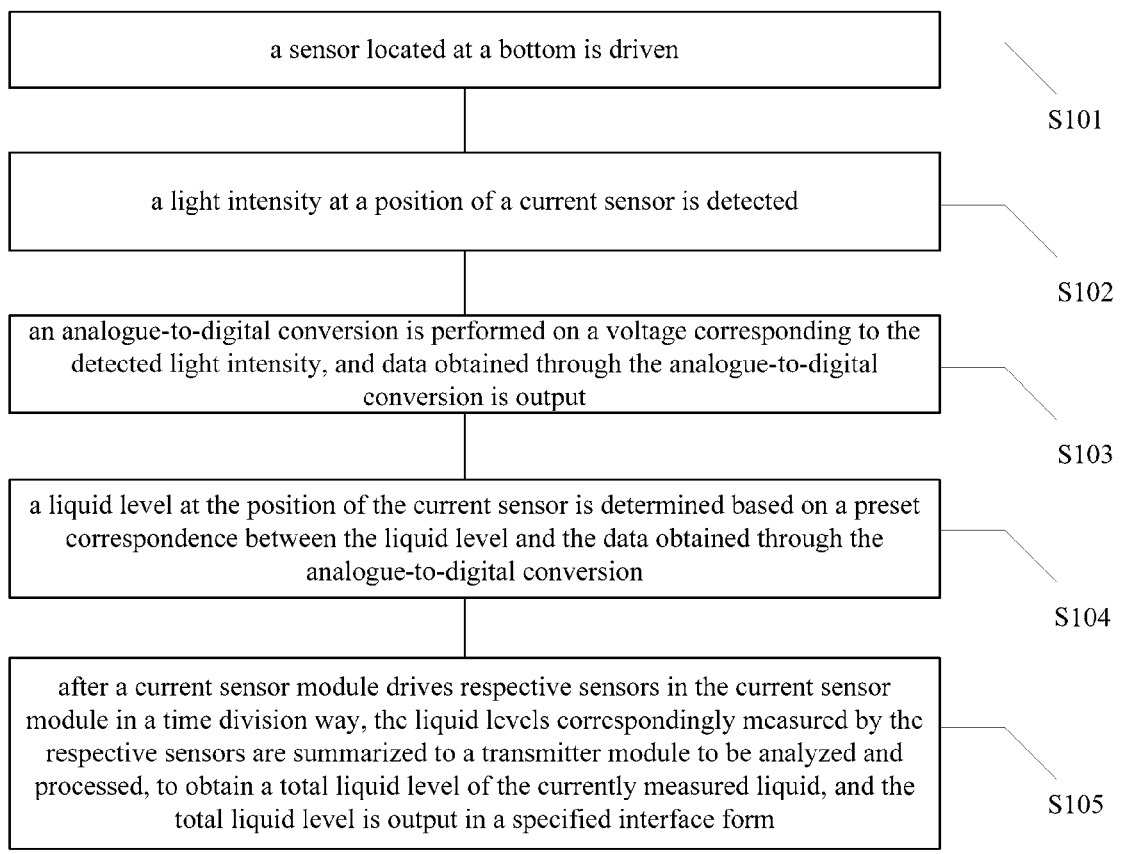
FIG. 1 is a flow chart of a method for a photoelectric-type continuous measurement of a liquid level according to a first embodiment of the disclosure.

Based on the above core principles, a method for a photoelectric-type continuous measurement of a liquid level is provided according to the first embodiment. The method is executed by an apparatus for the photoelectric-type continuous measurement of the liquid level. The apparatus is based on a sensor module including N cascaded sensors, where N is greater than or equal to 1. FIG. 1 is a flow chart of the method. The method includes the following steps S101-S105.

In the step S101, a sensor located at a bottom is driven.

In the step S102, a light intensity at a position of a current sensor is detected.

In performing the step S102, the current sensor is a sensor currently in a driving state during upwardly driving the sensors.

In the step S103, an analogue-to-digital conversion is performed on a voltage corresponding to the detected light intensity, and data obtained through the analogue-to-digital conversion is output.

In performing the step S103, in case of driving the current sensor to detect the light intensity at the position of the current sensor, a probe light is propagated in a total reflection way along an internal surface of the sensor if there is no measured liquid at the position of the sensor. A returned probe light has a strong light intensity. The strong light intensity corresponds to a high voltage. Here, the analogue-to-digital conversion is performed on the high voltage and the data obtained through the analogue-to-digital conversion is output.

Correspondingly, a probe light is propagated in a refraction way along the internal surface of the sensor if there is the measured liquid at the position of the sensor. A returned probe light has a weak light intensity. The weak light intensity corresponds to a low voltage. Here, the analogue-to-digital conversion is performed on the low voltage and the data obtained through the analogue-to-digital conversion is output.

In the step S104, a liquid level at the position of the current sensor is determined based on a preset correspondence between the liquid level and the data obtained through the analogue-to-digital conversion.

In the step S105, after a current sensor module drives respective sensors in the current sensor module in a time division way, the liquid levels correspondingly measured by the respective sensors are summarized to a transmitter module to be analyzed and processed, to obtain a total liquid level of the currently measured liquid, and the total liquid level is output in a specified interface form.

In performing the above steps S101 to S105, the sensors in one sensor module are upwardly driven one by one, and the liquid levels at the positions of the respective sensors are measured one by one.

According to the first embodiment of the disclosure, since the individual sensors in one sensor module are upwardly driven one by one, the liquid levels at the positions of the respective sensors may be measured continuously. In addition, since each time only one sensor is driven, i.e., during measuring the liquid level, each time only one sensor is driven to operate, energy consumption of the entire sensor module or even energy consumption of the entire apparatus for the photoelectric-type continuous measurement of the liquid level may be reduced, thereby saving the energy.

A Second Embodiment

Figure 2:
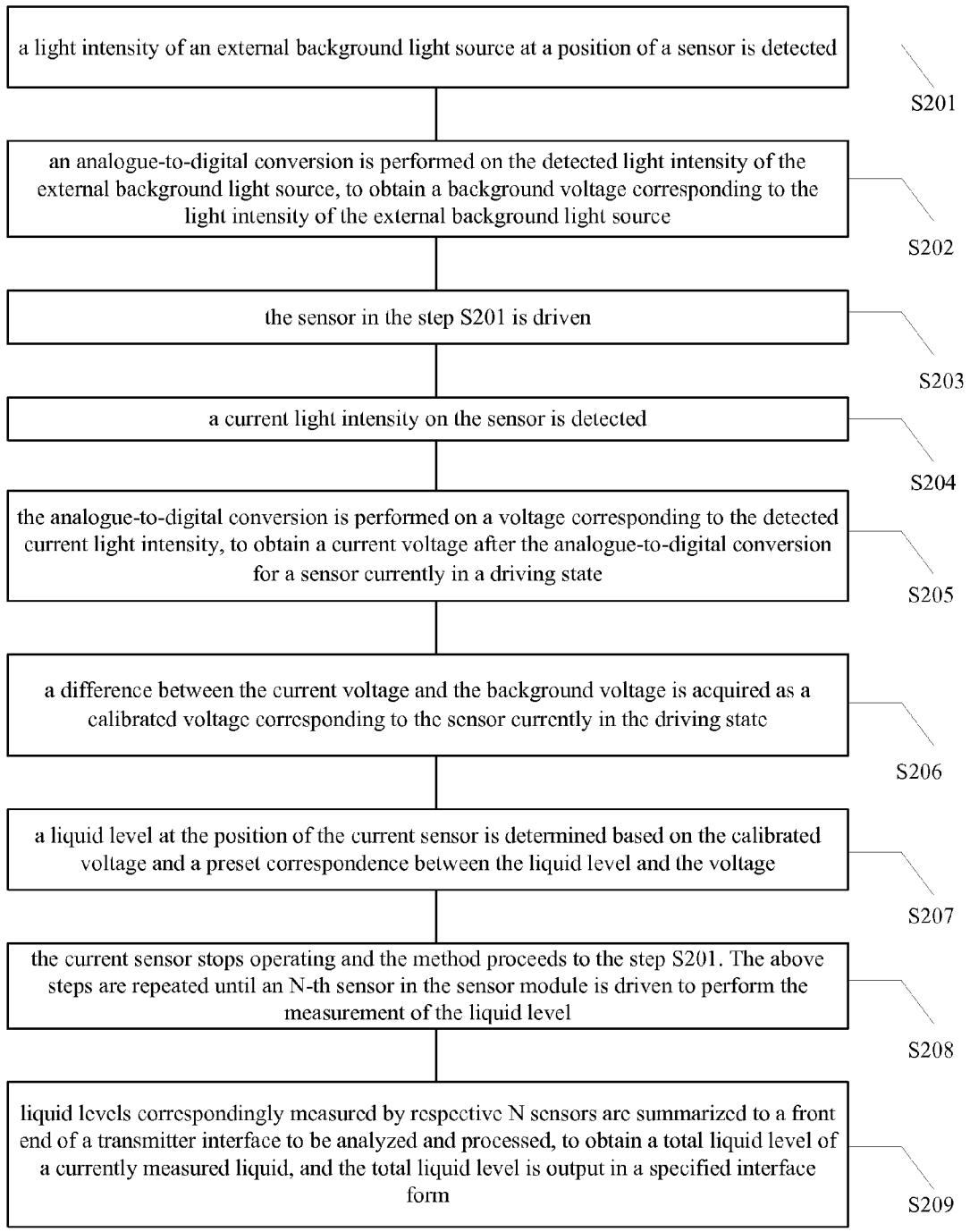
FIG. 2 is a flow chart of a method for a photoelectric-type continuous measurement of a liquid level according to a second embodiment of the disclosure.

With the foregoing method according to the first embodiment, in practically performing a measurement with the apparatus for the photoelectric-type continuous measurement of the liquid level, effects generated on a phototransistor by two portions of light are reflected in the data obtained through the analogue-to-digital conversion. One portion of light comes from an infrared light emitting diode (LED) light source and causes a useful signal. The other portion of light comes from a background light source in an external environment. A result of the measurement may be influenced if the background light source has a fluctuation. Hence, the effect generated by the light from the background light source should be removed. A method for a photoelectric-type continuous measurement of a liquid level is further provided according to the second embodiment based on the above embodiment, to avoid an influence caused by a light intensity of the background light source during the continuous measurement of the liquid level. The method is executed by an apparatus for the photoelectric-type continuous measurement of the liquid level. The apparatus is based on a sensor module including N cascaded sensors, where N is a positive integer greater than or equal to 1. FIG. 2 is a flow chart of the method. The method includes the following steps S201-S209.

In the step S201, a light intensity of an external background light source at a position of a sensor is detected.

In the step S202, an analogue-to-digital conversion is performed on the detected light intensity of the external background light source, to obtain a background voltage corresponding to the light intensity of the external background light source.

In the step S203, the sensor in the step S201 is driven.

In the step S204, a current light intensity on the sensor is detected.

In the step S205, the analogue-to-digital conversion is performed on a voltage corresponding to the detected current light intensity, to obtain a current voltage of a sensor currently in a driving state after the analogue-to-digital conversion.

In the step S206, a difference between the current voltage and the background voltage is acquired as a calibrated voltage corresponding to the sensor currently in the driving state.

In the step S207, a liquid level at the position of the current sensor is determined based on the calibrated voltage and a preset correspondence between the liquid level and the voltage.

In the step S208, the current sensor stops operating and the method proceeds to the step S201. The above steps are repeated until an N-th sensor in the sensor module is driven to perform the measurement of the liquid level.

In the step S209, liquid levels correspondingly measured by respective N sensors are summarized to a front end of a transmitter interface to be analyzed and processed, to obtain a total liquid level of a currently measured liquid, and the total liquid level is output in a specified interface form.

In performing the above steps S201 to S209, executions of the steps S203 to S205 are substantially consistent with executions of the steps S101 to S103 disclosed according to the first embodiment of the disclosure. The executions of the steps S203 to S205 may be referred to the executions of the steps S101 to S103 and are not repeated here.

According to the second embodiment of the disclosure, before the individual sensors in one sensor module are upwardly driven one by one, the light intensity of a corresponding background light source at the position of each sensor is detected, the background voltage corresponding to the light intensity of the background light source is determined, and the analogue-to-digital conversion is performed on the background voltage. After one sensor is driven, the light intensity measured by the sensor is acquired, and the analogue-to-digital conversion is performed on the voltage corresponding to the measured light intensity to obtain the current voltage; and then the difference between the current voltage obtained through the analogue-to-digital conversion and the background voltage is calculated, thereby calibrating the voltage corresponding to the light intensity received by the sensor. Therefore, the continuous measurement of the liquid level is achieved, and at the same time, influences caused on the measurements of the liquid levels at the positions of the respective sensors by the background light sources corresponding to the respective sensors are removed.

A Third Embodiment

Practically, in using the methods according to the above embodiments, a container, in which a liquid level is to be measured on site, substantially has a height ranging from 30 cm to 200 cm. It is not possible to assemble the adopted sensor module based on a measurement range once the sensor module is produced, and it is inconvenient to transport an assembled sensor module having a measurement range of 200 cm.

Figure 3:
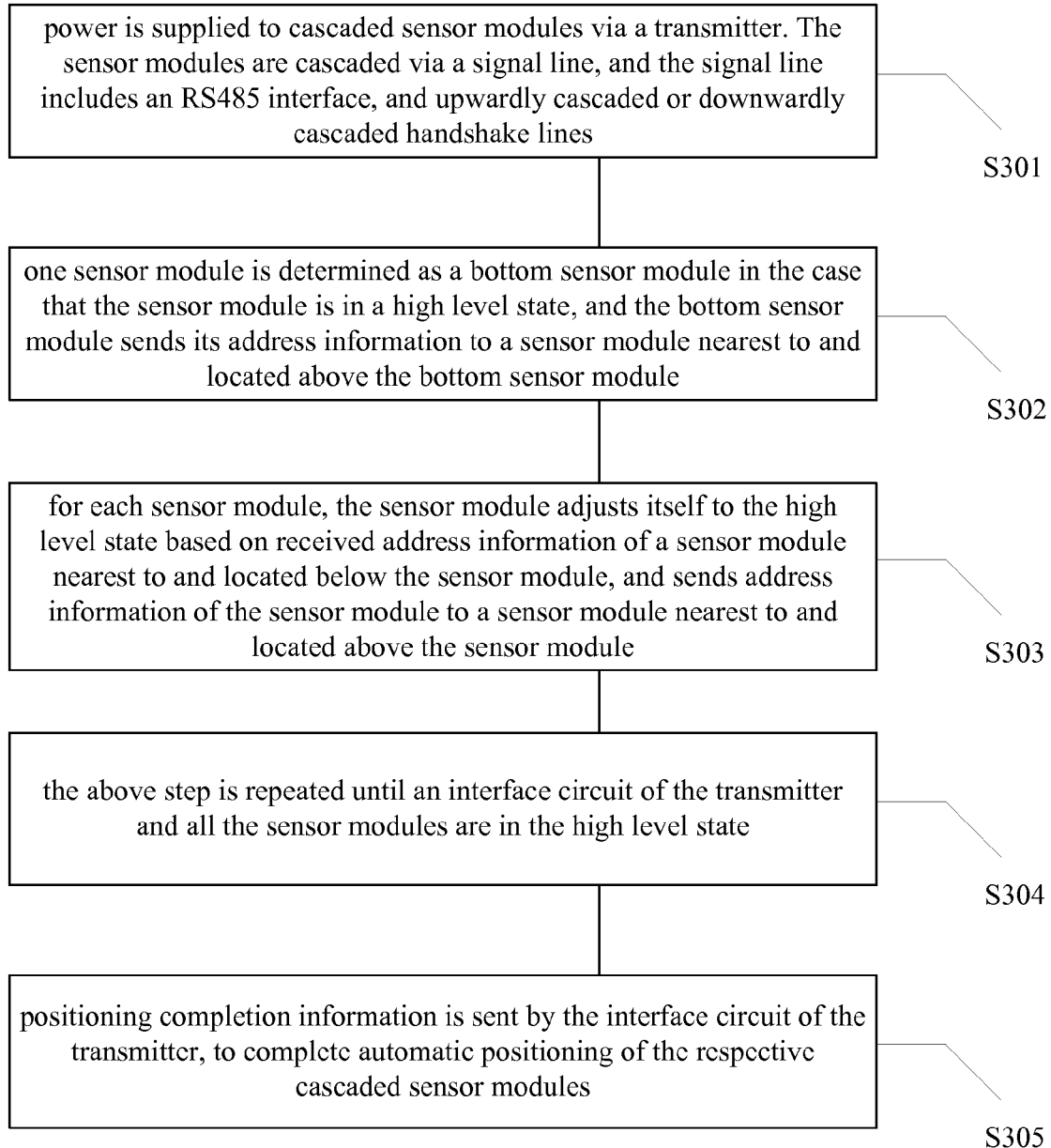
FIG. 3 is a flow chart of an automatic positioning method according to a third embodiment of the disclosure.

Therefore, multiple sensor modules may be cascaded to perform a continuous measurement of the liquid level in the case that a large liquid level is required to be measured. In the case that there are two or more cascaded sensor modules in the apparatus for the photoelectric-type continuous measurement of the liquid level, a method for automatically positioning the sensor modules during assembling the sensor modules is provided according to the embodiment of the disclosure. A flow chart of the method is shown in FIG. 3. The method includes steps as follows.

In a step S301, power is supplied to cascaded sensor modules via a transmitter. The sensor modules are cascaded via a signal line, and the signal line includes an RS485 interface, and upwardly cascaded or downwardly cascaded handshake lines.

In a step S302, one sensor module is determined as a bottom sensor module in the case that the sensor module is in a high level state, and the bottom sensor module sends its address information to a sensor module nearest to and located above the bottom sensor module.

In a step S303, for each sensor module, the sensor module adjusts itself to the high level state based on received address information of a sensor module nearest to and located below the sensor module, and sends address information of the sensor module to a sensor module nearest to and located above the sensor module.

In a step S304, the above step is repeated until an interface circuit of the transmitter and all the sensor modules are in the high level state.

In a step S305, positioning completion information is sent by the interface circuit of the transmitter, to complete automatic positioning of the respective cascaded sensor modules.

In performing the above steps S301 to S305, where the two or more cascaded sensor modules are located in the formed apparatus for the photoelectric-type continuous measurements of the liquid level are determined.

In performing the measurement of the liquid level, the individual sensor modules are upwardly driven one by one based on the positioning of the sensor modules according to the embodiment of the disclosure, and the respective sensor modules control, in a time division way, sensors corresponding to the respective sensor modules to perform measurements of liquid levels.

After the respective sensor modules measure the corresponding liquid levels, information of the liquid levels measured by the respective sensor modules is summarized to a front end of a transmitter interface module to be analyzed and processed, to obtain a total liquid level of a currently measured liquid, and the total liquid level is output in a specified interface form.

Therefore, the sensor modules according to the third embodiment of the disclosure may be assembled freely on a work site and have an automatic cascading function, while no particular debugging or setting is further required.

It should be noted that, with a modular and segmental measurement design, the sensors have a dynamic self-calibration function. In practical application, the surface of the measured liquid is at the position of one sensor among the numerous sensors, and other sensors are either in a state indicating that there is the liquid or in a state indicating that there is no liquid. For a sensor without the existence of the liquid, a photoelectric receiver of the sensor outputs a voltage representing a zero liquid level under a current environmental state of the sensor (surface contamination and sensor drift are taken into consideration). For a sensor with the existence of the liquid, the photoelectric receiver of the sensor outputs a voltage representing a full scale liquid level under a current environmental state of the sensor (the surface contamination, the sensor drift and optical characteristics of the measured liquid are taken into consideration). Therefore, a dynamic calibration may be performed frequently during operation based on changes of the liquid level, which improves the measurement accuracy of the sensors.

Due to the dynamic self-calibration function, capabilities of anti-pollution and anti-drift of the sensors are improved, and accordingly measurements performed by the sensors are more stable and reliable. Furthermore, the sensors are well adapted to liquids having various refractive indexes and various transparencies. For the modular and segmental measurement, the accuracy is only decided by the sensor where the surface of the measured liquid locates. The measurement accuracy of the sensors may be further improved with the dynamic self-calibration function.

In addition, it should be noted that, the sensors are generally driven by a constant current according to the above embodiments of the disclosure.

In the case that a temperature compensation is performed during upwardly driving the sensors one by one to perform the measurement of the liquid level, the sensors are driven by a constant current or by a constant voltage.

In the case that a constant current source is used to drive the sensors, the light intensities detected by the sensors are stable, and the detected intensities are also stable in case of an application of the temperature compensation. Therefore, the sensors are driven by the constant current or the constant voltage in the case that the temperature compensation is performed.

It should be noted that, in case of starting a new measurement of the liquid level, the sensors may perform a quick measurement with the dynamic self-calibration function. The quick measurement with the dynamic self-calibration includes the following steps.

First, a previously recorded total liquid level of the measured liquid is acquired.

Second, a sensor corresponding to the total liquid level, a position of a sensor module including the sensor, and a previous liquid level corresponding to the sensor are determined based on the total liquid level.

Third, the determined sensor is initiated and a liquid level at the position of the currently determined sensor is determined.

In performing the measurement, the sensor may be partly immersed in the liquid, completely immersed in the liquid, or totally not immersed in the liquid.

In the case that the determined sensor is partly immersed in the liquid, a current total liquid level after starting the new measurement of the liquid level is obtained by increasing or decreasing the total liquid level.

In the case that the current total liquid level is known, and it is determined that all sensors below a current surface of the liquid are completely immersed in the liquid and all sensors above the current surface of the liquid are totally not immersed in the liquid, the sensors with determined liquid level states are driven respectively, calibrated voltages are acquired, and corresponding full scale data or corresponding zero point data is updated, thereby achieving the dynamic self-calibration for a re-measurement.

That is to say, in the case that the current total liquid level is known, i.e., it is determined that all the sensors below the current surface of the liquid are completely immersed in the liquid and all the sensors above the current surface of the liquid are totally not immersed in the liquid, the sensors with determined liquid level states may be driven respectively, the calibrated voltages may be acquired with the approach for acquiring the calibrated voltages according to the second embodiment, and the data corresponding to full scale or zero point is updated based on the calibrated voltages, thereby achieving the dynamic self-calibration for the re-measurement.

In the case that the determined sensor is completely immersed in the liquid, a sensor nearest to and located above the determined sensor or a sensor at a bottom of a sensor module nearest to and located above the determined sensor is initiated to perform the measurement of the liquid level, and the process proceeds to the step of determining a liquid level at the position of the currently determined sensor.

In the case that the determined sensor is totally not immersed in the liquid, a sensor nearest to and located below the determined sensor or a sensor at a top of a sensor module nearest to and located below the determined sensor is initiated to perform the measurement of the liquid level, and the process proceeds to the step of determining a liquid level at the position of the currently determined sensor.

According to the embodiment, it is determined whether the sensor is partially immersed in the liquid, completely immersed in the liquid, or totally not immersed in the liquid and a corresponding liquid level is output, based on a correspondence between the detected light intensity at the position of the sensor and the liquid level.

With the dynamic self-calibration described above, several sensors close to the sensor outputting a high voltage in a previous measurement of the liquid level may be driven in case of a new measurement of the liquid level, to reduce numbers of the sensors and the sensor modules repeatedly initiated in two or more measurements, thereby achieving the quick measurement of the liquid level and reducing the system power consumption. In addition, the capabilities of anti-pollution and anti-drift of the sensors may be improved through the dynamic self-calibration, thereby making the measurement of the liquid level performed by the sensors more stable and reliable. Furthermore, the sensors are well adapted to liquids having various refractive indexes and various transparencies.

A Fourth Embodiment

The method for the photoelectric-type continuous measurement of the liquid level is detailed according to the foregoing embodiments of the disclosure. The method provided in the disclosure may be implemented by various forms of apparatuses. An apparatus for the photoelectric-type continuous measurement of the liquid level is further provided in the disclosure.

Figure 4:
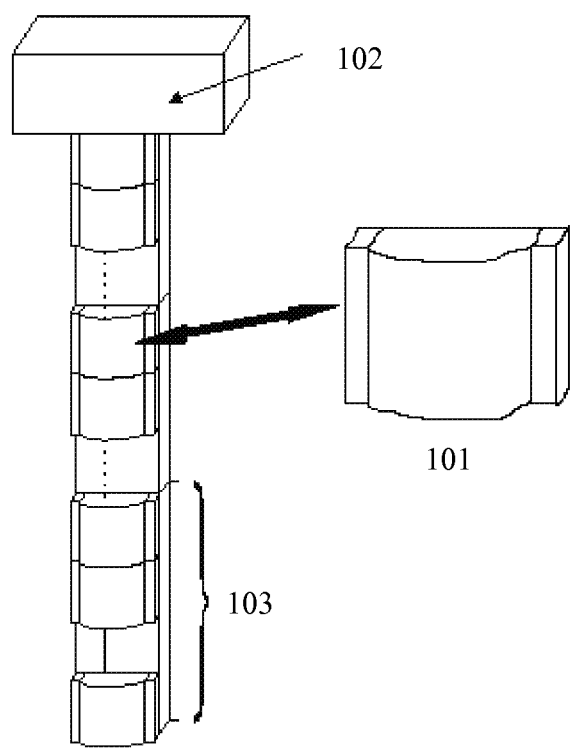
FIG. 4 is a schematic structural diagram of an apparatus for a photoelectric-type continuous measurement of a liquid level according to a fourth embodiment of the disclosure.

FIG. 4 illustrates the apparatus for the photoelectric-type continuous measurement of the liquid level according to the fourth embodiment of the disclosure. The apparatus mainly includes at least one sensor module 103.

The sensor module 103 includes multiple cascaded sensors 101, an analogue-to-digital converter (not shown in FIG. 4) and a microprocessor (not shown in FIG. 4).

The multiple cascaded sensors 101 are mainly for detecting light intensities at positions of the respective sensors and voltages corresponding to the respective light intensities.

The analogue-to-digital converter is for performing an analogue-to-digital conversion on the voltages output by the sensors 101.

The microprocessor is connected with the cascaded sensors 101 and the analogue-to-digital converter. The microprocessor is mainly for upwardly driving the cascaded sensors 101 one by one to perform the measurement of the liquid level; receiving voltages after the analogue-to-digital conversion of the respective sensors output by the analogue-to-digital converter; determining liquid levels at positions of the respective sensors 101 based on a preset correspondence between the liquid levels and the voltages after the analogue-to-digital conversion; and summarizing the liquid levels correspondingly measured by the respective sensors 101 to a front end of a transmitter interface module 102 to analyze and process the summarized liquid levels, to output a total liquid level of a currently measured liquid.

According to the embodiment of the disclosure, firstly, one sensor 101 having a measurement range from 10 mm to 20 mm is produced by utilizing a photoelectric principle; then 10 sensors 101 are cascaded to form one sensor module 103; and finally, the sensor modules are combined together based on a required measurement range and are provided with a corresponding transmitter interface 102.

In practical application, with the apparatus for the photoelectric-type continuous measurement of the liquid level formed by cascading multiple sensor modules 103 according to the fourth embodiment of the disclosure, requirements for the measurement of the liquid level in containers having various shapes and sizes may be satisfied. All the sensors 101 form a whole through an adhesive sealing. The individual sensor modules 103 are connected via screws, nuts and locking pieces. In practical implementation, there are many ways to connect the sensor modules and the ways are not detailed here.

Figure 5:
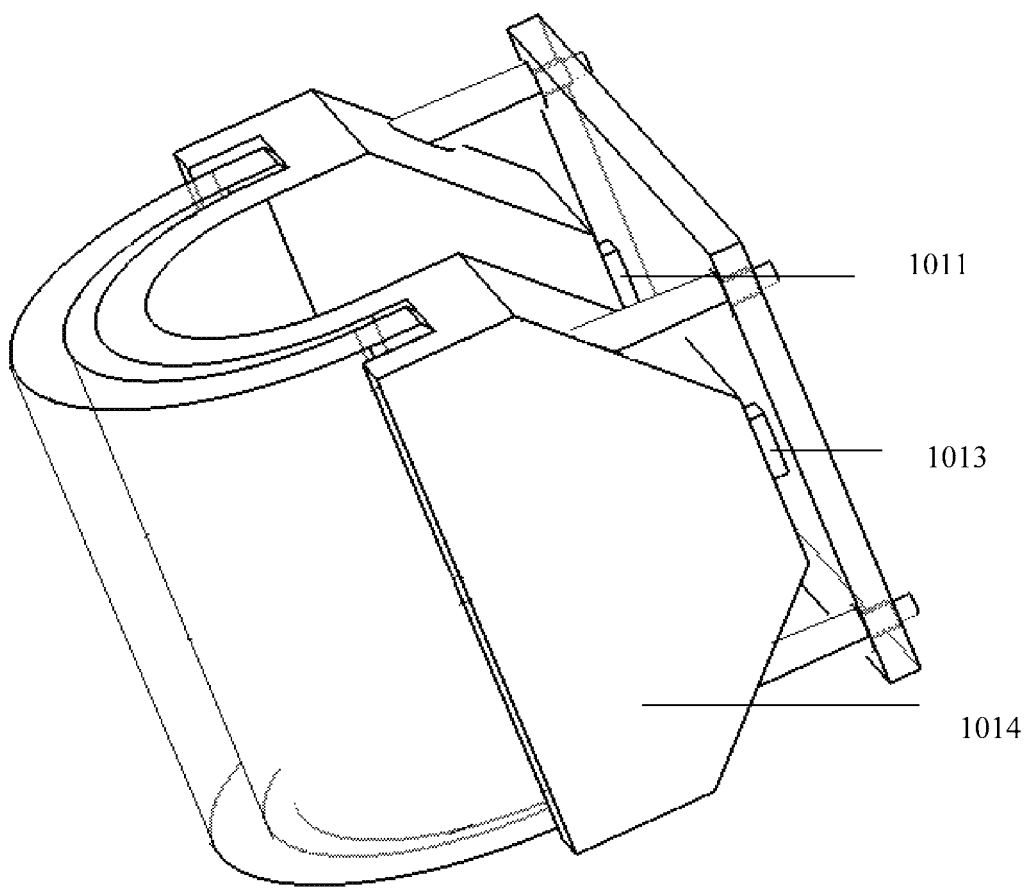
FIG. 5 is a structural diagram of a sensor according to the fourth embodiment of the disclosure.

It should be noted that, a structure of the sensor included in the sensor module according to the fourth embodiment of the disclosure is shown in FIG. 5. The sensor mainly includes the following components: an infrared light source 1011, a cavity 1012, a photosensitive device 1013, and a blocking structure 1014.

The infrared light source 1011 is for emitting an incident light. Generally, the infrared light source 1011 is an infrared light emitting diode.

During measuring the liquid level by the sensor, the infrared light emitting diode 1011 works discontinuously. In a working duration of the whole sensor module, nonworking time of one infrared light emitting diode 1011 is long. With this working mode, power consumption of the sensor module is reduced.

The cavity 1012 is made of an optically denser material. The cavity 1012 is for propagating the incident light emitted from the infrared light source. The optically denser material includes a plastic with a preset quantity of organic pigments, or an organic glass. For example, the cavity 1012 may be made of polycarbonate.

The blocking structure 1014 is arranged at the outside of the cavity, and is for blocking a light emitted by a background light source from entering the inside of the sensor. The photosensitive device 1013 is for receiving or sensing a light intensity of an emergent light after propagation through the cavity and determining a voltage corresponding to the light intensity of the emergent light. The blocking structure 1014 is generally made of a black opaque material, with which the emergent light is prevented from returning to a photoelectric receiver in other ways. In addition, devices such as the light source 1011, the photosensitive device 1013 and a printed circuit board (not shown in FIG. 5) are fixed and position-determined by the blocking structure 1014.

In the case that the measurement of the liquid level is performed based on the foregoing components in the sensor, the incident light emitted from the infrared light source is propagated by the cavity made of the optically denser material. In the case that the incident light is emitted from an optically denser medium to an optically thinner medium, a total reflection occurs with an angle of incidence $\angle i$ exceeding a certain degree, and the light returns along a predetermined path. The sensor may detect a strong light intensity substantially consistent with the light intensity of the incident light, and the analogue-to-digital conversion is performed on the strong light intensity to output a high voltage corresponding to the strong light intensity.

It should be noted that, in the case that the incident light is emitted from an optically thinner medium to an optically denser medium, a light refraction occurs rather than the reflection. The sensor may detect a light intensity much weaker than the light intensity of the incident light, and the analogue-to-digital conversion is performed on the weak light intensity to output a low voltage corresponding to the weak light intensity.

Light detected by the sensor is only related with an initial light intensity of the incident light and distribution of the light propagated in the optically denser medium. The light detected by the sensor is not related with factors such as the temperature and the pressure of the liquid.

In addition, the cavity made of the optically denser medium has an outside diameter of 20 mm and an inside diameter of 13.6 mm. The inside diameter and the outside diameter may be designed based on actual usage requirements.

It should be noted that, the cavity made of an optically denser propagation material has the following advantages in practical application:

first, the incident light is prevented from reaching the photoelectric receiver directly through the inside of the optically denser propagation material, rather than propagates along walls of the cavity; and second, thanks to a smooth inner wall of the cavity, a reflected light toward the inner wall may be reflected back and further propagate along an outer wall of the cavity.

It should be noted that, lights emitted from the infrared light source are propagated dispersedly. Reflected lights may not be converged to the photoelectric receiver without adjusting propagation directions of the lights. A light returned to the photoelectric receiver is expected to have a linear correspondence with a change of the liquid level, and in this case a highest signal resolution is achieved. Therefore, in designing optical paths, it is required that paths of the lights propagating along propagation surfaces are evenly distributed and parallel, and the returned lights are converged to the photoelectric receiver via a convex lens.

Figure 6:
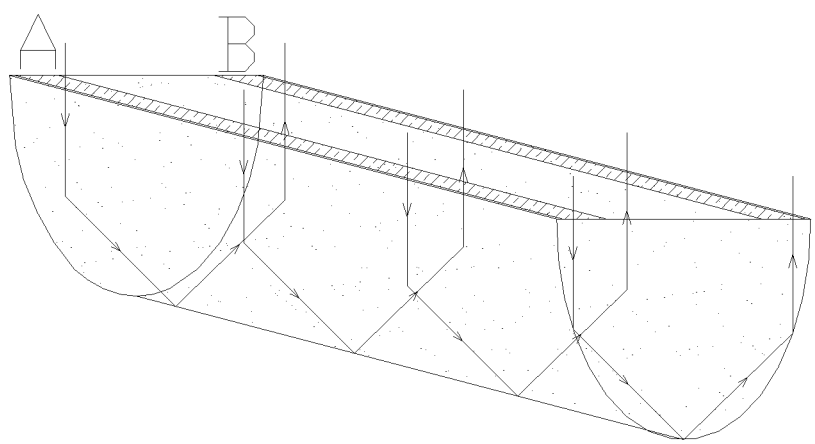
FIG. 6 is a sectional view of a cavity made of an optically denser propagation material according to the fourth embodiment of the disclosure.

In another aspect, in practical application, it is not possible to utilize many optical lenses to adjust the incident lights since the sensor has a small size. FIG. 6 illustrates the cavity made of the optically denser propagation material. Two planes A and B of the cavity are designed into convex lenses, to make the incident lights parallel. Plane A receives the incident lights emitted from the light resource, and plane B propagates emergent lights.

According to the disclosed embodiment, a measurement range of the sensor is generally from 10 mm to 20 mm, but it is not limited thereto.

Generally, the photosensitive device 1013 is a phototransistor.

Generally, the infrared light source 1011 is an infrared light emitting diode light source, and an angle $\angle i$ of the incident light emitted from the infrared light source 1011 is smaller than 57.17 degrees and larger than 39.1 degrees.

It should be noted that, in the case that the optically thinner medium around the cavity made of polycarbonate is air, a relative refractive index of polycarbonate with respect to air is 1.586, and a critical angle $\angle C1$ is approximately equal to 39.1 degrees. In the case that the angle of incidence $\angle i$ is larger than 39.1 degrees, the incident light is totally reflected in polycarbonate, and the reflected light is emitted from another side of the tubular cavity.

In the case that the optically thinner medium around the cavity made of polycarbonate is water, a relative refractive index of polycarbonate with respect to water is 1.333, and a critical angle $\angle C2$ is approximately equal to 57.17 degrees. In the case that the angle of incidence ∠i is smaller than 57.17 degrees, the incident light is refracted at a boundary between polycarbonate and water, and no light is emitted from another side of the tubular cavity.

Therefore, with the angle of incidence ∠i larger than 39.1 degrees and smaller than 57.17 degrees, the reflected light may be emitted from another side of the tubular cavity if the optically thinner medium is air, while no light is emitted from another side of the tubular cavity if the optically thinner medium is air.

In summary, with the angle of incidence ∠i larger than 39.1 degrees and smaller than 57.17 degrees, a refraction occurs in the cavity with existence of water, and no light is received by the photoelectric receiver located at another side of the cavity; or a total reflection occurs in the cavity with existence of air, and an emergent light is received by the photoelectric receiver located at another side of the cavity.

An infrared transmitter and an infrared receiver are provided in each sensor. In measurement, the sensors work independently and may not affect each other. With a segmental measurement, it is ensured that the sensors have high measurement accuracy, and a measurement error is smaller than 1 mm.

In practical application, stability of the light intensity may influence accuracy of the measurement of the liquid level. To ensure that the light intensity of the infrared light emitted from the infrared light emitting diode does not change as the temperature changes, the sensor module further includes a temperature sensor for performing a temperature compensation to the infrared light source and the photoelectric receiver.

Figure 7:
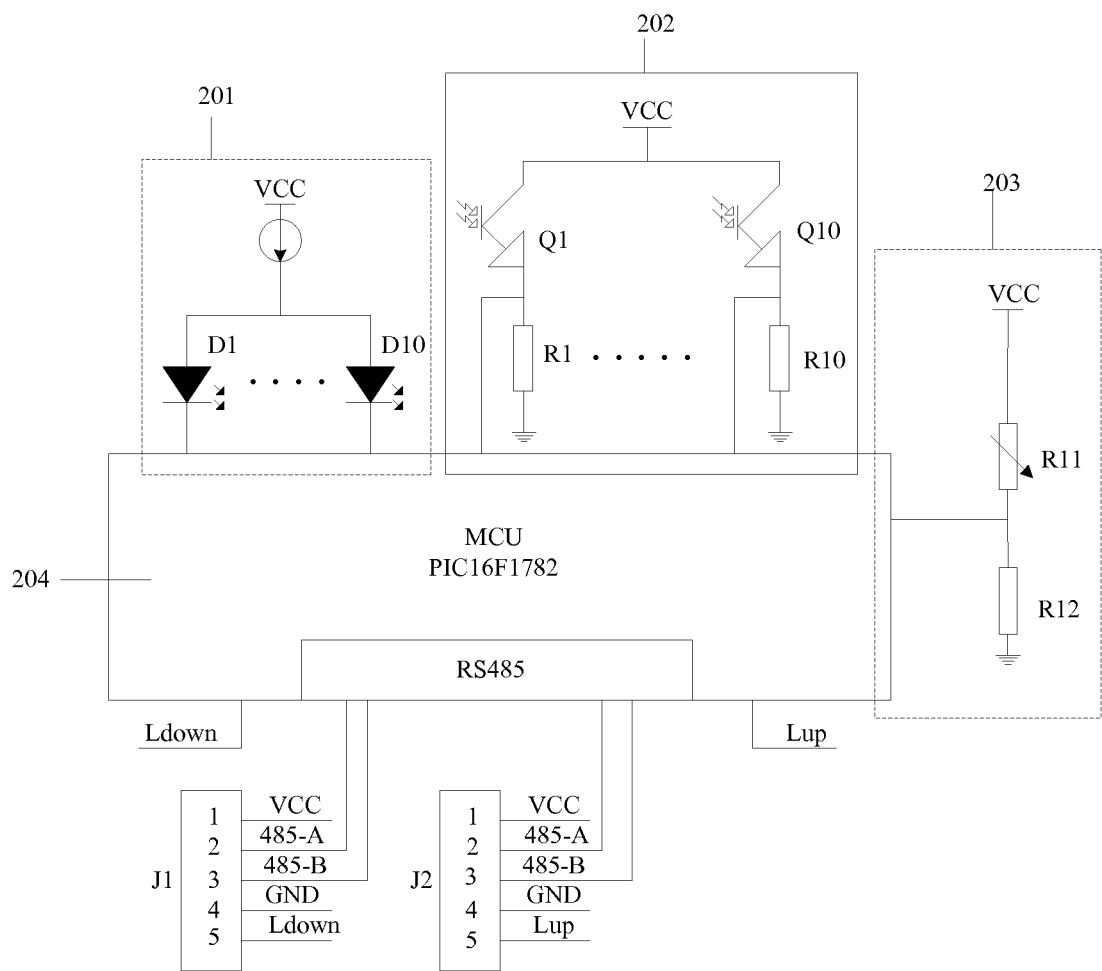
FIG. 7 illustrates a sensor measuring circuit according to the fourth embodiment of the disclosure.

As shown in FIG. 7, a sensor measuring circuit is further provided in the disclosure. In the sensor measuring circuit, a light source module 201, a photoelectric receiver module 202 and a thermistor module 203 are respectively connected to a microprocessor module 204.

The light source module 201 includes light sources D1 to D10 and a power supply VCC.

The photoelectric receiver module 202 includes phototransistors Q1 to Q10, a power supply VCC, and conversion resistors R1 to R10. The conversion resistors R1 to R10 collect currents in the circuit and feed the currents back to the microprocessor module, and output currents are linear to resistances of the conversion resistors.

The thermistor module 203 includes a power supply VCC, a thermistor R11 and a conversion resistor R12.

The microprocessor 204 includes a PIC 16F1782 Micro Control Unit (MCU).

To further improve the measurement accuracy of the apparatus provided in the disclosure, during measuring the liquid level at the position of a certain sensor, the analogue-to-digital conversion is performed, before the infrared light emitting diode emits light, to obtain data with existence of only the environment background light source; after the infrared light emitting diode emits light, measurement processes are repeated; and then subtraction is performed between the data obtained from two conversions. Hence, only a useful signal returned from the infrared LED light source is remained, while the influence of the background light source is removed. In this way, when one sensor performs the measurement, the infrared LED works discontinuously. In a working duration of the whole module, the nonworking time of the infrared LED included in one sensor is long. With this working mode, power consumption of the module is reduced.

A Fifth Embodiment

Multiple sensor modules may be cascaded to perform a continuous measurement of the liquid level in the case that a large liquid level is required to be measured. The sensor module further includes a cascading interface circuit for performing an automatic cascading positioning and for transmitting liquid level information.

Data communication among the modules is mainly performed through an RS485 interface. The cascading positioning is completed with one single control line, i.e., lower parts Ldown and upper parts Lup. Two power lines are provided. Each interface includes 5 terminals. To cascade and assemble the sensor modules, Ldown of each module is connected with Lup of a module nearest to and located below the module, and Ldown of a module at the bottom is floated.

By connecting the sensor modules with the five terminals, the automatic cascading positioning and the transmission of the liquid level information, of the sensor modules, may be achieved.

In the case that there are two or more cascaded sensor modules in an apparatus for a photoelectric-type continuous measurement of a liquid level, the apparatus further includes a transmitter and an interface circuit corresponding to the transmitter.

A transmitter module is provided, for supplying power to the cascaded sensor modules; coordinating the individual sensor modules to complete the automatic cascading positioning; controlling each of the sensor modules to perform measurements of liquid levels; acquiring and analyzing the liquid levels correspondingly measured by the respective sensor modules, to determine a total liquid level of a currently measured liquid; and outputting the total liquid level in a specified output form.

A cascading interface module includes:

a voltage regulator module, for providing a stable operating voltage to the transmitter; and a digital cascading interface, for linking positioning information reflecting positions of the respective sensor modules and liquid level information recorded by the respective sensor modules, and transmitting the positioning information and the liquid level information to the transmitter.

Most apparatuses for the photoelectric-type continuous measurement of the liquid level need to be installed and debugged on site. A fuel tank on site has a height ranging from 30 cm to 200 cm. The height is not determined and an assembly according to a measurement range is not possible once the apparatus is produced. In addition, it is inconvenient to transport an assembled transmitter having a measurement range of 200 cm. The apparatus for the photoelectric-type continuous measurement of the liquid level provided in the disclosure has a modular structure. The sensor modules may be assembled freely on site and have an automatic cascading positioning function, while no particular debugging or setting is required.

Based on the automatic positioning method according to the third embodiment of the disclosure, actual processes of an automatic cascading positioning based on a system including the transmitter interface and the sensors are shown as follows.

First, when the transmitter supplies the power, Lups of all modules output a low level, and Ldowns correspondingly connected to the Lups are pulled to a low level. Only the Ldown of the module at the bottom is in a high level, and the module at the bottom acquires that it is at the bottom.

Second, the module at the bottom informs, via the RS485 interface, all other modules that the module at the bottom is found and the cascading positioning is started now.

Third, the module at the bottom sends address information and releases its Lup, to inform an upper-layer module.

Then, the upper-layer module sends address information based on a state of the Ldown of the upper-layer module, and releases the Lup of the upper-layer module.

And then, the previous process is repeated until the Ldown of the transmitter interface circuit turns into a high level.

Finally, the transmitter interface circuit sends positioning completion information, to complete the automatic positioning.

The interface may be set flexibly based on user requirements. The interface may be analog, for example, 4 mA to 20 mA, 0V to 5V, or 0V to 10 V. Or the interface may be digital, for example, the RS485 or a MODBUS.

A Sixth Embodiment

In combination with the methods and apparatus disclosed from the first embodiment to the fifth embodiment of the disclosure, a dynamic self-calibration during two or more measurements is further disclosed.

To initiate a sensor module for a new measurement of a liquid level, several certain sensors may be driven based on a previously recorded liquid level, to perform a direct measurement of the liquid level.

Processes of a liquid level measurement are illustrated with an example that the apparatus for the photoelectric-type continuous measurement of the liquid level according to the foregoing embodiment of the disclosure includes one sensor module. If the sensor module includes 10 cascaded sensors and a previously measured liquid level is located at a fifth sensor, liquid levels at position of several sensors close to the fifth sensor (which are generally sensors above and below the fifth sensor) may be measured in a next measurement, to determine the liquid level. Specific execution processes are given as follows.

A light intensity at a position of a fourth sensor is detected. An analogue-to-digital conversion is performed on the detected light intensity. In the case that an output fourth voltage is a low voltage, a fourth liquid level corresponding to the fourth voltage is output based on a preset correspondence between the voltage value and the liquid level, and the forth liquid level is saved.

A driving of the fourth sensor is stopped, and the fifth sensor is driven to detect the light intensity. The light intensity at the position of the fifth sensor is detected, and the analogue-to-digital conversion is performed on the detected light intensity. In the case that an output fifth voltage is a voltage between the low voltage and a high voltage, a fifth liquid level corresponding to the fifth voltage is output based on the preset correspondence between the voltage and the liquid level, and the fifth liquid level is saved.

A driving for the fifth sensor is stopped, and a sixth sensor is driven to detect the light intensity. In measuring the light intensity at a position of the sixth sensor, if an output sixth voltage is the high voltage, information of the liquid level corresponding to the fifth sensor and information of the position of the fifth sensor are acquired, and a total liquid level currently measured by the sensor module is determined based on the above information and is output.

Therefore, it may be determined that the liquid level is still located at the fifth sensor.

According to the embodiment of the disclosure, a first sensor to a third sensor may be omitted from being driven, thereby reducing power consumption of the whole sensor module and improving working efficiency of the sensor module.

Similarly, the above approach can also be used in the case that the apparatus for the photoelectric-type continuous measurement of the liquid level includes multiple cascaded sensor modules. First, a total liquid level is determined, and then the dynamic self-calibration is performed based on a state of the liquid level at the position of a determined sensor.

In the embodiments of the disclosure, the probe light is the incident light.

In summary, the method for the photoelectric-type continuous measurement of the liquid level and the apparatus thereof are provided in the disclosure with the above descriptions. With a modular structure, the sensor modules may be freely assembled and positioned according to requirements of the measurement range, and the liquid level may be measured accurately in any situations, thereby improving adaptability for different measurement ranges and facilitating the transportation. In addition, a real time self-calibration function is provided, thereby improving the capabilities of anti-pollution and anti-drift.

Steps of the method or algorithm described in conjunction with the embodiments disclosed herein may be implemented directly with hardware, a software module executed by a processor, or a combination thereof. The software module may be placed in a Random Access Memory (RAM), a memory, a Read Only Memory (ROM), an electrically-programmable ROM, an electrically erasable programmable ROM, a register, a hard disk, a removable disk, a CD-ROM, or a storage medium in any other forms well known in the art.

The embodiments in the specification are described in a progressive manner, with the emphasis of each of the embodiments on the difference from other embodiments; hence, same or similar parts between the embodiments may be referred to each other. Since the apparatus according to the embodiment corresponds to the methods according to the embodiments, the description of the apparatus is simple and the related part may be referred to the descriptions of the methods.

With the above descriptions of the embodiments disclosed herein, those skilled in the art may implement or use the disclosure. Numerous modifications to these embodiments are apparent to those skilled in the art, and the general principle defined herein can be implemented in other embodiments without deviation from the spirit or scope of the disclosure. Therefore, the disclosure is not limited to the embodiments described herein, but is in accordance with a widest scope consistent with the principle and novel features disclosed herein.

What is claimed is:

1. A method for a photoelectric-type continuous measurement of a liquid level, wherein the method is applied to an apparatus for the photoelectric-type continuous measurement of the liquid level, the apparatus comprises at least one sensor module, and the sensor module comprises a plurality of cascaded sensors;

wherein the method comprises:
driving the sensors upwardly one by one, to perform measurements of liquid levels,
after a light intensity of a probe light returned at a position of a sensor currently in a driving state is detected, performing an analogue-to-digital conversion on a voltage corresponding to the detected light intensity to obtain current analogue-to-digital conversion data,
determining the liquid level at the position of a current sensor based on a preset correspondence between the liquid level and the analogue-to-digital conversion data, and
after a current sensor module drives the respective sensors in the current sensor module in a time division way, summarizing the liquid levels correspondingly measured by the respective sensors to a transmitter module to analyze and process the summarized liquid levels to obtain a total liquid level of a currently measured liquid, and outputting the total liquid level in a specified interface form.

2. The method according to claim 1, wherein the process of driving the current sensor to detect the light intensity returned at the position of the current sensor and performing the analogue-to-digital conversion on the voltage corresponding to the detected light intensity comprises:

propagating a probe light in a total reflection way along an internal surface of the sensor to return a probe light having a strong light intensity, in the case that there is no measured liquid at the position of the sensor; performing the analogue-to-digital conversion on a high voltage corresponding to the strong light intensity of the returned probe light; and outputting data obtained through the analogue-to-digital conversion;

propagating a probe light from the sensor to the measured liquid through a refraction at a portion with existence of the liquid and maintaining propagating a probe light in the total reflection way at a portion without existence of the liquid, in the case that the sensor is partially immersed in the measured liquid, to return a probe light having a light intensity changing with the liquid level; performing the analogue-to-digital conversion on a voltage corresponding to the returned probe light having the changing light intensity; and outputting data obtained through the analogue-to-digital conversion;

propagating a probe light in a refraction way along the internal surface of the sensor to return a probe light having a weak light intensity, in the case that the sensor is completely immersed in the measured liquid; performing the analogue-to-digital conversion on a low voltage corresponding to the weak light intensity of the returned probe light; and outputting data obtained through the analogue-to-digital conversion.

3. The method according to claim 2, wherein in case of starting a new measurement of the liquid level, the method further comprises:

acquiring a previously recorded total liquid level of the measured liquid;

determining a sensor corresponding to the total liquid level, a position of a sensor module comprising the determined sensor and a previous liquid level corresponding to the determined sensor, based on the total liquid level;

initiating the currently determined sensor and determining a liquid level at the position of the currently determined sensor;

in the case that the determined sensor is partly immersed in the liquid, increasing or decreasing the total liquid level to obtain a current total liquid level after starting the new measurement of the liquid level;

in the case that the current total liquid level is known and it is determined that all sensors below a current surface of the liquid are completely immersed in the liquid and all sensors above the current surface of the liquid are totally not immersed in the liquid, respectively driving the sensors with determined liquid level states, acquiring calibrated voltages, and updating corresponding full scale data or corresponding zero point data, to complete a dynamic self-calibration for a re-measurement;

in the case that the determined sensor is completely immersed in the liquid, initiating a sensor nearest to and located above the determined sensor or a sensor at a bottom of a sensor module nearest to and located above the determined sensor to perform the measurement of the liquid level, and returning to perform the step of determining a liquid level at the position of the currently determined sensor; and in the case that the determined sensor is totally not immersed in the liquid, initiating a sensor nearest to and located below the determined sensor or a sensor at a top of a sensor module nearest to and located below the determined sensor to perform the measurement of the liquid level, and returning to perform the step of determining a liquid level at the position of the currently determined sensor.

4. The method according to claim 1, further comprising:

before driving the sensor, detecting light intensity of an external background light source at the position of the sensor, and performing the analogue-to-digital conversion on the detected light intensity of the external background light source to obtain a background voltage corresponding to the light intensity of the external background light source;

after driving the sensor, detecting a current light intensity on the sensor, and performing the analogue-to-digital conversion on a voltage corresponding to the detected current light intensity to obtain a current voltage of the sensor currently in a driving state after the analogue-to-digital conversion;

acquiring a difference between the current voltage and the background voltage as a calibrated voltage corresponding to the sensor currently in the driving state; and determining the liquid level at the position of the current sensor based on the preset correspondence between the liquid level and the analogue-to-digital conversion data.

5. The method according to claim 4, wherein in case of starting a new measurement of the liquid level, the method further comprises:

acquiring a previously recorded total liquid level of the measured liquid;

determining a sensor corresponding to the total liquid level, a position of a sensor module comprising the determined sensor and a previous liquid level corresponding to the determined sensor, based on the total liquid level;

initiating the currently determined sensor and determining a liquid level at the position of the currently determined sensor;

in the case that the determined sensor is partly immersed in the liquid, increasing or decreasing the total liquid level to obtain a current total liquid level after starting the new measurement of the liquid level;

in the case that the current total liquid level is known and it is determined that all sensors below a current surface of the liquid are completely immersed in the liquid and all sensors above the current surface of the liquid are totally not immersed in the liquid, respectively driving the sensors with determined liquid level states, acquiring calibrated voltages, and updating corresponding full scale data or corresponding zero point data, to complete a dynamic self-calibration for a re-measurement;

in the case that the determined sensor is completely immersed in the liquid, initiating a sensor nearest to and located above the determined sensor or a sensor at a bottom of a sensor module nearest to and located above the determined sensor to perform the measurement of the liquid level, and returning to perform the step of determining a liquid level at the position of the currently determined sensor; and in the case that the determined sensor is totally not immersed in the liquid, initiating a sensor nearest to and located below the determined sensor or a sensor at a top of a sensor module nearest to and located below the determined sensor to perform the measurement of the liquid level, and returning to perform the step of determining a liquid level at the position of the currently determined sensor.

6. The method according to claim 1, wherein a way to drive the sensors comprises a constant current driving.

7. The method according to claim 6, wherein in case of starting a new measurement of the liquid level, the method further comprises:

acquiring a previously recorded total liquid level of the measured liquid;

determining a sensor corresponding to the total liquid level, a position of a sensor module comprising the determined sensor and a previous liquid level corresponding to the determined sensor, based on the total liquid level;

initiating the currently determined sensor and determining a liquid level at the position of the currently determined sensor;

in the case that the determined sensor is partly immersed in the liquid, increasing or decreasing the total liquid level to obtain a current total liquid level after starting the new measurement of the liquid level;

in the case that the current total liquid level is known and it is determined that all sensors below a current surface of the liquid are completely immersed in the liquid and all sensors above the current surface of the liquid are totally not immersed in the liquid, respectively driving the sensors with determined liquid level states, acquiring calibrated voltages, and updating corresponding full scale data or corresponding zero point data, to complete a dynamic self-calibration for a re-measurement;

in the case that the determined sensor is completely immersed in the liquid, initiating a sensor nearest to and located above the determined sensor or a sensor at a bottom of a sensor module nearest to and located above the determined sensor to perform the measurement of the liquid level, and returning to perform the step of determining a liquid level at the position of the currently determined sensor; and in the case that the determined sensor is totally not immersed in the liquid, initiating a sensor nearest to and located below the determined sensor or a sensor at a top of a sensor module nearest to and located below the determined sensor to perform the measurement of the liquid level, and returning to perform the step of determining a liquid level at the position of the currently determined sensor.

8. The method according to claim 1, wherein in the case that the apparatus for the photoelectric-type continuous measurement of the liquid level comprises two or more cascaded sensor modules, the method further comprises:

supplying power to the cascaded sensor modules via the transmitter module, wherein the sensor modules are cascaded via a signal line, and the signal line comprises an RS485, and upwardly cascaded or downwardly cascaded handshake lines;

determining one sensor module as a bottom sensor module in the case that the one sensor module is in a high level state, and sending address information of the bottom sensor module to a sensor module nearest to and located above the bottom sensor module;

adjusting, by each sensor module, a voltage state of the each sensor module into a high voltage state based on the address information received from a sensor module nearest to and located below the each sensor module, and sending, by the each sensor module, the address information of the each sensor module to a sensor module nearest to and located above the each sensor module;

repeating the above step until an interface circuit of the transmitter module and all the sensor modules are in the high level state;

sending positioning completion information by the interface circuit of the transmitter module, to complete an automatic positioning of the respective cascaded sensor modules;

during the measurement of the liquid level, driving the individual sensor modules upwardly one by one based on the positioning of the sensor modules, and controlling, in a time division way by the respective sensor modules, the sensors corresponding to the respective sensor modules to perform the measurements of the liquid levels; and after each of the sensor modules measures corresponding liquid levels, summarizing information of the liquid levels measured by each of the sensor modules to a front end of a transmitter interface module to analyze and process the summarized information, to obtain the total liquid level of the currently measured liquid, and outputting the total liquid level in the specified interface form.

9. The method according to claim 8, wherein in case of starting a new measurement of the liquid level, the method further comprises:

acquiring a previously recorded total liquid level of the measured liquid;

determining a sensor corresponding to the total liquid level, a position of a sensor module comprising the determined sensor and a previous liquid level corresponding to the determined sensor, based on the total liquid level;

initiating the currently determined sensor and determining a liquid level at the position of the currently determined sensor;

in the case that the determined sensor is partly immersed in the liquid, increasing or decreasing the total liquid level to obtain a current total liquid level after starting the new measurement of the liquid level;

in the case that the current total liquid level is known and it is determined that all sensors below a current surface of the liquid are completely immersed in the liquid and all sensors above the current surface of the liquid are totally not immersed in the liquid, respectively driving the sensors with determined liquid level states, acquiring calibrated voltages, and updating corresponding full scale data or corresponding zero point data, to complete a dynamic self-calibration for a re-measurement;

in the case that the determined sensor is completely immersed in the liquid, initiating a sensor nearest to and located above the determined sensor or a sensor at a bottom of a sensor module nearest to and located above the determined sensor to perform the measurement of the liquid level, and returning to perform the step of determining a liquid level at the position of the currently determined sensor; and in the case that the determined sensor is totally not immersed in the liquid, initiating a sensor nearest to and located below the determined sensor or a sensor at a top of a sensor module nearest to and located below the determined sensor to perform the measurement of the liquid level, and returning to perform the step of determining a liquid level at the position of the currently determined sensor.

10. The method according to claim 1, wherein in case of starting a new measurement of the liquid level, the method further comprises:

acquiring a previously recorded total liquid level of the measured liquid;

determining a sensor corresponding to the total liquid level, a position of a sensor module comprising the determined sensor and a previous liquid level corresponding to the determined sensor, based on the total liquid level;

initiating the currently determined sensor and determining a liquid level at the position of the currently determined sensor;

in the case that the determined sensor is partly immersed in the liquid, increasing or decreasing the total liquid level to obtain a current total liquid level after starting the new measurement of the liquid level;

in the case that the current total liquid level is known and it is determined that all sensors below a current surface of the liquid are completely immersed in the liquid and all sensors above the current surface of the liquid are totally not immersed in the liquid, respectively driving the sensors with determined liquid level states, acquiring calibrated voltages, and updating corresponding full scale data or corresponding zero point data, to complete a dynamic self-calibration for a re-measurement;

in the case that the determined sensor is completely immersed in the liquid, initiating a sensor nearest to and located above the determined sensor or a sensor at a bottom of a sensor module nearest to and located above the determined sensor to perform the measurement of the liquid level, and returning to perform the step of determining a liquid level at the position of the currently determined sensor; and in the case that the determined sensor is totally not immersed in the liquid, initiating a sensor nearest to and located below the determined sensor or a sensor at a top of a sensor module nearest to and located below the determined sensor to perform the measurement of the liquid level, and returning to perform the step of determining a liquid level at the position of the currently determined sensor.

11. An apparatus for a photoelectric-type continuous measurement of a liquid level, comprising at least one sensor module, wherein the sensor module comprises:

a plurality of cascaded sensors, each of the plurality of cascaded sensors being configured to detect a light intensity at a position of the each sensor and a voltage corresponding to the light intensity;

an analogue-to-digital converter, configured to perform an analogue-to-digital conversion on the voltages output by the sensors; and a microprocessor connected with the cascaded sensors, wherein the microprocessor is configured to, upwardly drive the cascaded sensors one by one to perform the measurement of the liquid level, receive and store voltages after the analogue-to-digital conversion of the respective sensors output by the analogue-to-digital converter, determine liquid levels at positions of the respective sensors based on a preset correspondence between the liquid levels and the voltages after the analogue-to-digital conversion, and summarize the liquid levels correspondingly measured by the respective sensors to a front end of a transmitter interface to analyze and process the summarized liquid levels, to output a total liquid level of a currently measured liquid.

12. The apparatus according to claim 11, wherein the sensor comprises:

an infrared light source, configured to emit an incident light, the infrared light source comprising an infrared light emitting diode;

a cavity formed by an optically denser material, the cavity being configured to propagate the incident light emitted from the infrared light source, wherein the optically denser material comprises a plastic with a preset quantity of organic pigments, or an organic glass;

a blocking structure arranged at an outside of the cavity, the blocking structure being configured to block a light emitted by a background light source from entering an inside of the sensor; and a photosensitive device, configured to receive or sense a light intensity of an emergent light after being propagated by the cavity and determine a voltage corresponding to the received or sensed light intensity; and wherein the sensor has a measurement range from 10 mm and 20 mm.

13. The apparatus according to claim 12, wherein in the case that the apparatus for the photoelectric-type continuous measurement of the liquid level comprises two or more cascaded sensor modules, the apparatus further comprises a cascading interface module and a transmitter module;

wherein the cascading interface module comprises:

a voltage regulator module, configured to provide a stable operating voltage to a transmitter, and a digital cascading interface, configured to, link positioning information reflecting positions of the respective sensor modules and liquid level information recorded by the respective sensor modules, and transmit the positioning information and the liquid level information to the transmitter;

and wherein the transmitter module is configured to, supply power to the cascaded sensor modules, coordinate the individual sensor modules to complete an automatic cascading positioning, control each of the sensor modules to perform measurements of liquid levels, acquire and analyze the liquid levels correspondingly measured by the respective sensor modules, to determine the total liquid level of the currently measured liquid, and output the total liquid level in a specified output form.

14. The apparatus according to claim 11, wherein the sensor module further comprises:

a temperature sensor, configured to perform a temperature compensation on the infrared light source and on a photoelectric receiver; and a cascading interface circuit, configured to, perform an automatic cascading positioning and transmit liquid level information.

15. The apparatus according to claim 14, wherein in the case that the apparatus for the photoelectric-type continuous measurement of the liquid level comprises two or more cascaded sensor modules, the apparatus further comprises a cascading interface module and a transmitter module;

wherein the cascading interface module comprises:

a voltage regulator module, configured to provide a stable operating voltage to a transmitter, and a digital cascading interface, configured to, link positioning information reflecting positions of the respective sensor modules and liquid level information recorded by the respective sensor modules, and transmit the positioning information and the liquid level information to the transmitter;

and wherein the transmitter module is configured to, supply power to the cascaded sensor modules, coordinate the individual sensor modules to complete the automatic cascading positioning, control each of the sensor modules to perform measurements of liquid levels, acquire and analyze the liquid levels correspondingly measured by the respective sensor modules, to determine the total liquid level of the currently measured liquid, and output the total liquid level in a specified output form.

16. The apparatus according to claim 11, wherein in the case that the apparatus for the photoelectric-type continuous measurement of the liquid level comprises two or more cascaded sensor modules, the apparatus further comprises a cascading interface module and a transmitter module;

wherein the cascading interface module comprises:
- a voltage regulator module, configured to provide a stable operating voltage to a transmitter, and
- a digital cascading interface, configured to, link positioning information reflecting positions of the respective sensor modules and liquid level information recorded by the respective sensor modules, and transmit the positioning information and the liquid level information to the transmitter;

and wherein the transmitter module is configured to, supply power to the cascaded sensor modules, coordinate the individual sensor modules to complete an automatic cascading positioning, control each of the sensor modules to perform measurements of liquid levels, acquire and analyze the liquid levels correspondingly measured by the respective sensor modules, to determine the total liquid level of the currently measured liquid, and output the total liquid level in a specified output form.

* * * * *